(12) United States Patent
Wittebrood et al.

(10) Patent No.: US 9,377,249 B2
(45) Date of Patent: Jun. 28, 2016

(54) FIN STOCK MATERIAL

(71) Applicant: ALERIS ROLLED PRODUCTS GERMANY GMBH, Koblenz (DE)

(72) Inventors: Adrianus Jacobus Wittebrood, Velserbroek (NL); Steven Kirkham, Ransbach-Baumbach (DE); Achim Burger, Höhr Grenzhausen (DE); Klaus Vieregge, Nauort (DE)

(73) Assignee: ALERIS ROLLED PRODUCTS GERMANY GMBH, Koblenz (DE)

( * ) Notice: Subject to any disclaimer, the term of this patent is extended or adjusted under 35 U.S.C. 154(b) by 0 days.

(21) Appl. No.: 14/733,400

(22) Filed: Jun. 8, 2015

(65) Prior Publication Data

US 2015/0267969 A1    Sep. 24, 2015

Related U.S. Application Data

(62) Division of application No. 14/110,167, filed as application No. PCT/EP2012/054308 on Mar. 13, 2012.

(60) Provisional application No. 61/478,136, filed on Apr. 22, 2011.

(30) Foreign Application Priority Data

Apr. 20, 2011    (EP) .................................... 11163136

(51) Int. Cl.
*B23K 1/00* (2006.01)
*B23K 101/14* (2006.01)
(Continued)

(52) U.S. Cl.
CPC . *F28F 1/12* (2013.01); *B23K 1/008* (2013.01); *B23K 1/0012* (2013.01); *B23K 1/19* (2013.01);
(Continued)

(58) Field of Classification Search
CPC .. B23K 1/0012; B23K 1/008; B23K 2201/14; B23K 2203/10; B23K 35/002; B23K 35/0238; B23K 35/286; B23K 35/3613; B32B 15/016; C22C 21/00
USPC ......... 720/528, 529, 530, 531, 532, 533, 534, 720/535, 536, 537, 538, 540, 541, 543, 544, 720/547, 550, 551, 552, 553, 554
See application file for complete search history.

(56) References Cited

U.S. PATENT DOCUMENTS 3,182,481 A * 5/1965 Kinal et al. ..................... 72/326
4,244,756 A   1/1981 Tanabe et al.
(Continued)

FOREIGN PATENT DOCUMENTS

| CN | 101839665 A | 9/2010 |
| EP | 2149618 A1 | 2/2010 |

(Continued)

OTHER PUBLICATIONS http://www.matweb.com/reference/aluminumtemper.aspx Matweb; Material property Data 2015.
(Continued)

*Primary Examiner* — Erin Saad
(74) *Attorney, Agent, or Firm* — Vorys, Sater, Seymour and Pease LLP

(57) ABSTRACT

A fin stock material from an 3xxx-series aluminum alloy and including at least 0.5% to 2.0% Mn, and furthermore a purposive addition of one or more wetting elements selected from the group of: Bi 0.03% to 0.5%, Pb 0.03% to 0.5%, Sb 0.03% to 0.5%, Li 0.03% to 0.5%, Se 0.03% to 0.5%, Y 0.03% to 0.05%, Th 0.03% to 0.05%, and the sum of these elements being 0.5% or less, with the remainder including aluminum and tolerable impurities. Also provided is a method for manufacturing a heat exchanger assembly incorporating such a fin stock material.

19 Claims, 1 Drawing Sheet

(51) Int. Cl.

| | | |
|---|---|---|
| *F28F 21/00* | (2006.01) | |
| *F28F 21/08* | (2006.01) | |
| *F28F 1/12* | (2006.01) | |
| *C22C 21/04* | (2006.01) | |
| *C22C 21/10* | (2006.01) | |
| *C22F 1/043* | (2006.01) | |
| *C22F 1/053* | (2006.01) | |
| *B23K 1/008* | (2006.01) | |
| *B23K 1/19* | (2006.01) | |
| *B23K 35/38* | (2006.01) | |
| *C22C 21/00* | (2006.01) | |
| *C22C 21/02* | (2006.01) | |
| *C22F 1/04* | (2006.01) | |
| *C22F 1/00* | (2006.01) | |
| *F28D 1/053* | (2006.01) | |

(52) U.S. Cl.
CPC ............. *B23K 35/383* (2013.01); *C22C 21/00* (2013.01); *C22C 21/02* (2013.01); *C22C 21/04* (2013.01); *C22C 21/10* (2013.01); *C22F 1/00* (2013.01); *C22F 1/04* (2013.01); *C22F 1/043* (2013.01); *C22F 1/053* (2013.01); *F28F 21/08* (2013.01); *F28F 21/084* (2013.01); *F28F 21/089* (2013.01); *B23K 2201/14* (2013.01); *B23K 2203/10* (2013.01); *F28D 1/05383* (2013.01); *F28F 1/128* (2013.01); *F28F 2275/04* (2013.01)

(56) References Cited

U.S. PATENT DOCUMENTS

| | | |
|---|---|---|
| 2007/0099023 A1 | 5/2007 | Dulac et al. |
| 2010/0028101 A1 | 2/2010 | Bottura |
| 2011/0315748 A1 | 12/2011 | Dulac et al. |

FOREIGN PATENT DOCUMENTS

| | | |
|---|---|---|
| FR | 2862894 A1 | 6/2005 |
| FR | 2936597 A1 | 4/2010 |
| JP | 61159547 A | 7/1986 |
| JP | 8120380 A | 5/1996 |
| JP | 9025533 A | 1/1997 |
| JP | 2009034739 A | 2/2009 |

OTHER PUBLICATIONS

International Preliminary Report on Patentability of Oct. 22, 2013 for PCT International Application No. PCT/EP2012/054308, International Filing Date Mar. 13, 2012.
"International Alloy Designations and Chemical Composition Limits for Wrought Aluminum and Wrought Aluminum Alloys", Apr. 1, 2006, pp. 1-35.
"International Alloy Designations and Chemical Composition Limitsfor Wrought Aluminum and Wrought Aluminum Alloys", Apr. 1, 2004, pp. 1-35.
International Search Report dated Jun. 15, 2012 from PCT/EP2012/054308 to Wittebrood filed Mar. 13, 2012.
FR2862894A Jun. 3, 2005 computer english translation.

\* cited by examiner

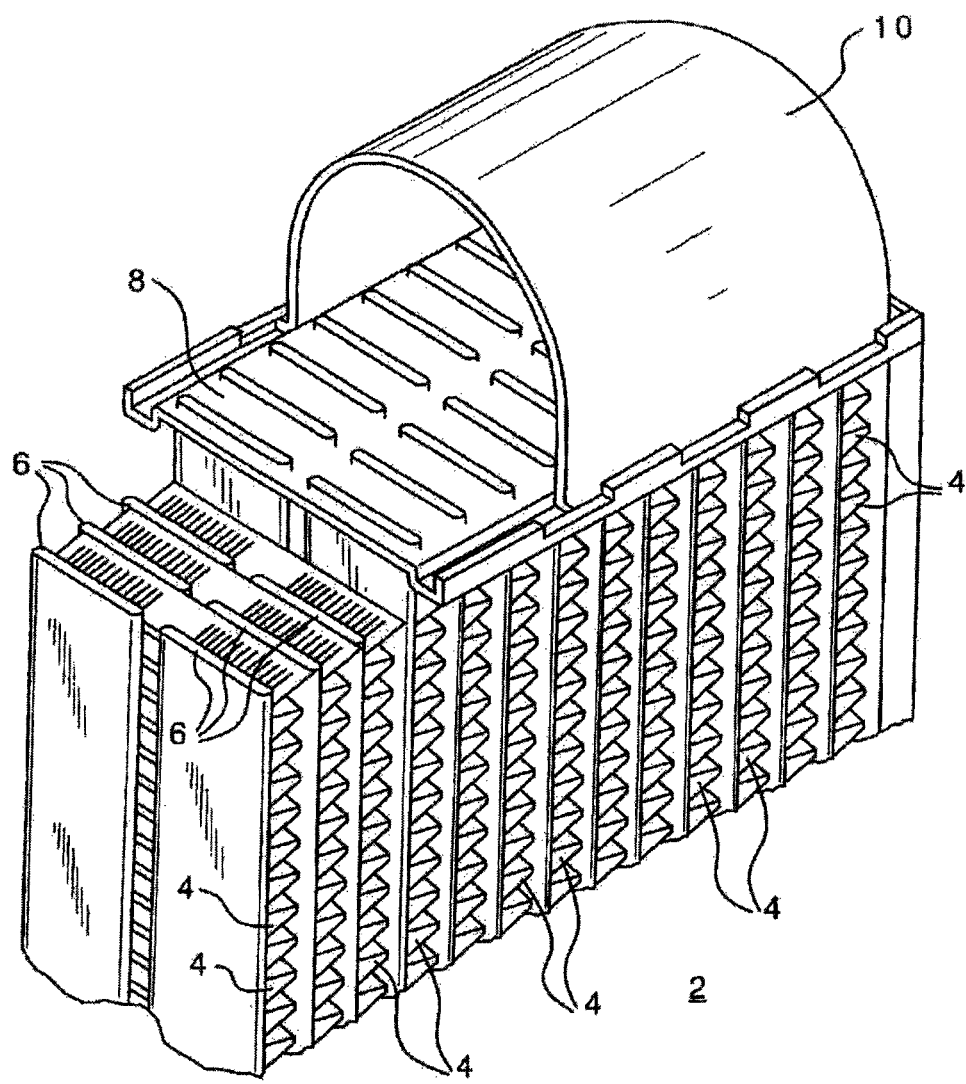

FIN STOCK MATERIAL

CROSS-REFERENCE TO RELATED APPLICATIONS

This is a divisional of U.S. patent application Ser. No. 14/110,167 which is a §371 National Stage Application of International Application No. PCT/EP2012/054308 filed on 13 Mar. 2012, claiming the priorities of European Patent Application No. 11163136.2 filed on 20 Apr. 2011 and U.S. Patent Application 61/478,136 filed on 22 Apr. 2011.

FIELD OF THE INVENTION

The invention relates to a fin stock material from a 3xxx-series aluminium alloy and comprising at least 0.5% to 2.0% Mn. The invention further relates to a method for manufacturing a heat exchanger assembly incorporating such a fin stock material.

BACKGROUND TO THE INVENTION

As will be appreciated herein below, except as otherwise indicated, aluminium alloy designations and temper designations refer to the Aluminium Association designations in Aluminium Standards and Data and the Registration Records, as published by the Aluminium Association in 2010 and are well known to the person skilled in the art.

For any description of alloy compositions or preferred alloy compositions, all references to percentages are by weight percent unless otherwise indicated. The term "up to" and "up to about", as employed herein, explicitly includes, but is not limited to, the possibility of zero weight-percent of the particular alloying component to which it refers. For example, up to about 0.05% Cr may include an alloy having no Cr.

Heat exchangers and other similar equipment, such as condensers, evaporators and the like for use in car coolers, air conditioning systems, industrial cooling systems, etc. usually comprise a number of heat exchange tubes arranged in parallel between two headers, each tube joined at either end to one of the headers. Corrugated fins are disposed in an airflow clearance between adjacent heat exchange tubes and are brazed to the respective tubes.

The fin material or fin stock for brazed heat exchangers is typically fabricated from 3xxx series aluminium alloys such as, for example AA3003 or AA3003 with a purposive addition of Zn up to about 3%.

The fin stock material is joined to the heat exchange tubes in a brazing operation employing an aluminium alloy brazing filler, most commonly made from an AA4xxx-series alloy. The brazing filler is typically present on the outersurface of the heat exchange tube, but also the use of a clad fin configuration alone is being employed.

The most used brazing processes used on an industrial scale are vacuum brazing and controlled atmosphere brazing using a salt-based brazing flux material.

Vacuum brazing is carried out at relatively low atmosphere pressure in the order of about $1 \times 10^{-5}$ mbar or less, and is an essentially discontinuous process and puts high demands on material cleanliness. To obtain the optimum conditions for joining to take place, aluminium alloys commonly used for vacuum brazing contain purposive additions of Mg of 1% or more. The Mg destroys the hard oxide film of the filler alloy when it evaporates from the brazing sheet during brazing, and further the evaporated Mg plays the role as getter that removes oxygen and moisture remaining in the brazing furnace. There is always more magnesium present in the furnace then necessary. The excess magnesium condenses on the cold sports in the vacuum furnace and has to be removed frequently. The capital investment for suitable equipment is relatively high.

NOCOLOK™ (registered trademark of Alcan) flux brazing has been used as the principal brazing process to braze automotive heat exchangers by many heat exchanger manufacturers. Major problems that have arisen from the NOCOLOK process have been flux costs, flux handling and the damage flux causes to the furnaces. Also, in complex shaped assemblies the application of the non-corrosive brazing flux prior to brazing at the interior of the assemblies is often considered very difficult and problematic. Consequently, most of the heat exchanger manufacturers have been trying to reduce flux consumption.

There is room for improvement in the art of aluminium alloy fin stock for brazed heat exchangers and for methods of manufacturing such brazed heat exchangers, in particular for brazing methods that do not require the application of a brazing flux material.

DESCRIPTION OF THE INVENTION

It is an object of the invention to provide an aluminium alloy fin stock material for brazed heat exchangers for use in particular for brazing methods that do not require the application of a brazing flux material.

This and other objects and further advantages are met or exceeded by the present invention and providing a fin stock material from an 3xxx-series aluminium alloy and comprising at least about 0.5% to about 2.0% Mn, and comprising furthermore a purposive addition of one or more wetting elements selected from the group consisting of: Bi 0.03% to 0.5%, Pb 0.03% to 0.5%, Sb 0.03% to 0.5%, Li 0.03% to 0.5%, Se 0.03% to 0.5%, Y 0.03% to 0.05%, Th 0.03% to 0.05%, and the sum of these elements being 0.5% or less, with the remainder comprising aluminium and tolerable impurities.

In accordance with the present invention it has been found that this invention allows for the manufacture of brazed assemblies incorporating aluminium workpieces including the aluminium alloy fins and whereby there is no demand to provide a brazing flux material, like a fluoride flux, in a controlled atmosphere brazing process. During the brazing cycle the wetting agent diffuses in the molten aluminium filler alloy used to braze the fin stock to the other components and whereby the wetting agent facilitates a good flowability of the molten filler alloy such that a good fillet formation is being obtained, even without the use of a flux material.

The wetting elements are selected from the group consisting of Bi, Pb, Li, Sb, Se, Y, and Th, and wherein the total amount of all said wetting element(s) is in a range of about 0.01% to 0.5%. Preferably the total amount of all wetting element(s) does not exceed 0.40%.

In a preferred embodiment the element Bi is selected from this group of wetting elements and is in a range of about 0.03% to 0.5%, and preferably in a range of about 0.03% to 0.35%, and a more preferred upper-limit is 0.30%, as being the most efficient wetting element for this purpose in the fin stock material during a controlled atmosphere brazing operation without applying a brazing flux material. Typically Bi levels are about 0.1% or about 0.2%.

Mn is the most important alloying element in the fin stock material and contributes to both particle and solid solution strengthening. The Mn content should be in the range of about 0.5% to 2.0%. A more preferred lower limit for the Mn content is about 0.8%. A more preferred upper limit for the Mn content is about 1.7%. Typical Mn levels are about 1.4% or about 1.1%.

Si contributes to both particle and solid solution strengthening. An insufficient Si content, for example of less than about 0.3%, results in reduced strengthening while too much Si, for example more than about 2.5%, results in decreased thermal conductivity and a reduced melting temperature undesirably affecting the heat exchanger during the brazing operations. A preferred lower limit for the Si content is about 0.5%. The upper limit for the Si content is 1.5%, and preferably about 1.2%.

Fe is present in all known aluminium alloys. With a too high Fe content among other things the formability of the material decreases and also the corrosion performance is decreasing. At the upper end of the allowable range of up to about 1.8%, the iron in the ally forms relatively small intermetallic particles during casting, in particular by means of continuous casting operations, that contribute to particle strengthening. However, the preferred admissible Fe content is up to about 0.8% maximum, and more preferably up to about 0.5% maximum. A practical Fe content is in the range of about 0.15% to 0.45% and allows for a good compromise in desired properties of the fin stock material such as post-braze strength and sagging resistance, while the fin stock material can be manufactured without great difficulties at least in part from scrap materials.

The fin stock material may have relatively high levels of Mn, Si and Fe without departing from the concept of the present invention. In particular when high solidification rates during casting, typically as obtained by continuous casting such as twin roll casting, are applied in the manufacturing process of producing the fin stock material the relatively high levels of alloying elements can be employed resulting in an alloy strip substantially without coarse intermetallics. When applying continuous casting techniques to produce feedstock for the fin stock material clearly also the lower and middle end of the disclosed ranges can be applied. In casting processes like direct chill (DC) casting of slabs or billets solidification rates up to about 100° C./sec are reached resulting in that in industrial practice the Fe level commonly does not exceed about 0.8%, the Mn level does not exceed about 1.7%, and the Si level does not about 1.3%, otherwise detrimental coarse intermetallics can be produced, such as for example, primary Fe-bearing intermetallics. The exact Si, Fe and Mn-contents are tuned based on the formability, strength, corrosion resistance and sag resistance requirements of the specific application.

The addition Mg increases the post-braze strength of the fin stock alloy significantly, but at too high levels it may increase the risk of incipient melting of phases in the fin stock material during the brazing operation. The Mg content can be present up to 0.5%, and preferably up to 0.35%. When from said group of wetting elements Bi is being applied, then the Mg content is preferably in a range of about 0.01 to 0.35%, and more preferably of about 0.01 to 0.2%.

Cu can enhance the post-braze strength of the fin stock material, however, it can have a detrimental influence on the corrosion potential of the fin material. Cu may be tolerated up to about 0.4%, this achieves an advantages in the tolerance of this fin stock alloy for impurity elements, and allows this alloy to be composed from large amounts of scrap material, such as discarded heat exchangers, but not limited to this example. A more preferred range for the Cu-level is up to about 0.20% as a compromise in achieving post-braze strength, corrosion resistance and brazeability. If the corrosion resistance prevails as most important property for the use of the fin stock material in a certain heat exchanger application, then the Cu content is preferably kept at levels below about 0.05%, for example at a level of 0.01% or 0.02%.

Ti may be present up to about 0.25% to act as a grain refining additive during the casting of an ingot of the fin alloy of the invention. Additional Ti may be added, for example due to their presence in scrap material, in order to increase the strength of the fin alloy by solubility hardening. The total amount of Ti present in the alloy should preferably not exceed about 0.20%, but preferably is less than about 0.10%.

The element Zn affects the corrosion potential of the fin stock material. By reducing the corrosion potential of the fin stock, Zn has the effect of causing the fins to function as sacrificial anodes, thereby providing corrosion protection for the tubes of the heat exchanger to which they are brazed. Zinc has a detectable, but relatively small effect on the strength and thermal conductivity. For this reason the minimum amount of Zn required for cathodic protection of the tube is added. Usually that will require at least about 0.35% Zn. More than about 1.5% Zn will have an impact on the self-corrosion rate. However, in some instances, higher Zn contents of, for example, up to about 2.5% Zn might be desirable at the expense of thermal conductivity and self-corrosion properties.

The element Indium in a range of up to about 0.20% may be added to the fin stock material in order to reach a more electro-negative corrosion potential. In is much more effective in reducing the corrosion potential of the fin alloy as compared to zinc additions. Typically about 0.1% In is as effective as about 2.5% Zn. When added as a deliberate alloying element a more preferred range for In is about 0.01% to 0.10%, and more preferably of 0.01% to 0.04%. Also Sn may be added in a range of up to about 0.40% as an alternatively for In.

Zr in a range of up to about 0.25% may be added to the alloy of this invention in order to further improve the strength of the fin alloy product in the post-braze condition. Further, this element may be tolerated as an impurity element without adversely affecting the desired properties of the alloy. A more preferred Zr level is in the range of about 0.05% to 0.20%, and more preferably in a range of about 0.06% to 0.15%.

Each of V and Cr in a range of each up to about 0.25% may be added to the fin stock material in order to further improve the strength of the alloy in the post-braze condition. However, Cr is known to reduce thermal conductivity. Therefore, Cr is preferably not present and kept below about 0.05%, and more preferably kept below about 0.03%. Also the V content is preferably kept at a level below about 0.03%.

Preferably, if added to the fin stock material, the total combined amount of all the dispersoid forming alloying elements Zr, Cr, and V does not exceed 0.3% to avoid the formation of coarse constituent particles.

Ni has been shown to promote strength without a significant detrimental influence on thermal conductivity. It is known, however, to have a negative impact on the self-corrosion characteristics of the fin. It is envisioned that up to about 0.3% might be tolerated in some specific instances, however, in general, Ni should be kept to less than about 0.05%, and preferably less than 0.03%.

The fin stock material is preferably free of each of the elements Na, Li, K, and Ca to avoid any interference with the Bi, and any optional Mg, during the controlled atmosphere brazing operation, or any of the other wetting agents. With "free" is meant that no purposeful addition of Na, Li, K, and Ca was made to the chemical composition but that due to impurities and/or leaking from contact with manufacturing equipment, trace quantities of Na, Li, K, and Ca may nevertheless find their way into the filler alloy product. For example, less than 0.008% is an example of a trace quantity.

The balance is made by aluminium and incidental impurities and tolerable impurities, typically each up to 0.05% maximum and in total about 0.25% maximum, and preferably in total not exceeding 0.10%.

In an embodiment of the fin stock material according to this invention the aluminium alloy comprises,
- Mn about 0.5% to 2.0%
- Si about 0.3% to 1.5%
- Fe up to about 1.8%, preferably 0 to about 0.8%, for example about 0.2% or about 0.3%,
- Zn up to about 2.5%
- Mg up to about 0.5%, preferably about 0.01% to 0.35%,
- Cu up to about 0.4%, preferably up to about 0.20%,
- Bi about 0.03% to 0.5%, preferably about 0.03% to 0.35%,
- optionally one or more elements selected from the group of (up to about 0.25% Zr, up to about 0.25% Cr, up to about 0.25% V, up to about 0.25% Ti, up to about 0.20% In, up to about 0.3% Ni), with the remainder comprising aluminium and tolerable impurities, preferably each up to 0.05%, the total 0.25% maximum.

And with preferred narrower ranges for the various alloy elements are as herein disclosed and claimed.

In an embodiment of the fin stock material according to this invention the aluminium alloy comprises,
- Mn about 0.5% to 2.0%
- Si about 0.3% to 1.5%
- Fe up to about 1.8%, preferably up to about 0.8%, for example about 0.2% or about 0.3%,
- Zn up to about 2.5%
- Mg up to about 0.5%, preferably about 0.01% to 0.35%,
- Cu up to about 0.4%, preferably up to about 0.20%,
- Zr about 0.05% to 0.25%,
- Cr up to about 0.25%, preferably up to about 0.05%,
- Bi about 0.03% to 0.5%, preferably about 0.03% to 0.35%,
- Ti up to about 0.25%, for example about 0.03% or about 0.09%, and with the remainder comprising aluminium and tolerable impurities, preferably each up to 0.05%, the total 0.25% maximum.

And with preferred narrower ranges for the various alloy elements are as herein disclosed and claimed.

In an embodiment of the fin stock material according to this invention the aluminium alloy which is free of Na, Li, K, and Ca, and consisting of,
- Mn about 0.5% to 2.0%
- Si about 0.3% to 1.5%
- Fe up to about 1.8%, preferably up to about 0.8%, for example about 0.2% or about 0.35%,
- Zn up to about 2.5%
- Mg up to about 0.5%, preferably about 0.01% to 0.35%,
- Cu up to about 0.4%, preferably up to about 0.20%,
- Zr about 0.05% to 0.25%,
- Cr up to about 0.05%,
- Bi about 0.03% to 0.5%, preferably about 0.03% to 0.35%,
- Ti up to about 0.25%,
- and with the remainder comprising aluminium and tolerable impurities, each up to 0.05%, the total 0.25% maximum.

And with preferred narrower ranges for the various alloy elements are as herein disclosed and claimed.

To allow the wetting element(s) present in the fin stock material to perform its function in a CAB cycle without the use of a brazing flux material, it is important that during a brazing cycle the wetting element can diffuse to the outersurface of the fin stock material. For that reason it is preferred that the fin stock material is provided in a bare form, thus devoid of any metallic layers, such as for example a 4xxx-series brazing clad layer, on its outersurface that may hinder or restrict the functionality of the wetting elements(s).

At final gauge the fin stock material is typically at a gauge in the range of about 0.05 mm to 0.3 mm. A more preferred upper-limit for the gauge is about 0.15 mm.

Fin stock material is typically, but not exclusively, provided in an H1x or H2x temper, such as for example the H14 and H22 temper.

In another aspect of the invention there is provided in a brazed assembly, typically a heat exchanger, comprising the fin stock material of the invention. In such a heat exchanger having the fin stock material of the invention as corrugated fins, the fins may act as a sacrificial anode. The brazed heat exchanger typically comprises at least one tank structured to hold a coolant; a header plate coupled to said at least one tank, said header plate including a plurality of apertures; a plurality of substantially parallel fluid-carrying tubes each extending substantially perpendicular from one of said plurality of apertures in said header plate and structured to receive said coolant therethrough; and a plurality of fins, said fins being in thermal communication with said plurality of fluid-carrying tubes and structured to transfer heat away therefrom, in order to cool said coolant as it circulates therein, said plurality of fins being made from the fin stock material as herein disclosed and claimed.

Another aspect of the invention relates to a method of manufacturing an article, a heat exchanger, joined by brazing or an assembly of brazed components, comprising the steps of:
- (a) providing or forming the components to be brazed together of which at least one is made from the fin stock material according to this invention;
- (b) assembling the components, corrugated fin stock material and other components such as tubes, into an assembly;
- (c) brazing the assembly without applying a brazing flux on the assembly of components, and brazing the whole assembly in a controlled inert gas atmosphere at a brazing temperature, typically at a temperature in a range of about 540° C. to 615° C., e.g. about 600° C. or about 590° C., for a period long enough for melting and spreading of a brazing material joining the various components, e.g. a dwell time of 2 to 5 minutes, typically at around 2 or 3 minutes; and whereby typically the oxygen content in the brazing atmosphere should be as low as reasonable possible, and is preferably below about 200 ppm, and more preferably below about 100 ppm, for example at 15 ppm or less;
- (d) cooling of the brazed assembly, typically to below about 100° C., e.g. to ambient temperature.

For the purposes of this invention, and as used herein, the term "controlled atmosphere brazing" or "CAB" refers to a brazing process which utilizes an inert atmosphere, for example, nitrogen, argon or helium in the brazing of aluminium alloy articles, and is distinct from vacuum brazing in particular in that with CAB the brazing atmosphere in the furnace during the brazing operation is at about regular atmospheric pressure, although a slight under-pressure (for example working at a pressure of about 0.1 bar or more) or having a slight over-pressure can be used to facilitate the control of the inert gas atmosphere and to prevent an influx of oxygen containing gas into the brazing furnace.

FIG. 1 is an isometric view of a portion of a brazed heat exchanger.

As shown in FIG. 1, a brazed aluminium heat exchanger 2 in accordance with the present invention includes a plurality of fluid-carrying tubes 6. The ends of the fluid-carrying tubes 6 are open to a header plate 8 and a tank 10 (one end of the fluid-carrying tubes 6, one header plate 8 and one tank 10 are shown in FIG. 1). Coolant is circulated from the tank 10, through the fluid-carrying tubes 6 and into another tank (not shown). As shown, a plurality of cooling fins 4, made from the fin stock material according to this invention, are disposed between the fluid-carrying tubes 6, in order to transfer heat away therefrom thereby facilitating a heat exchange cooling the fluid therein.

While various embodiments of the technology described herein have been described in detail, it is apparent that modifications and adaptations of those embodiments will occur to those skilled in the art. However, it is to be expressly understood that such modifications and adaptations are within the spirit and scope of the presently disclosed technology.

The invention claimed is:

1. A brazed assembly comprising a plurality of substantially parallel fluid-carrying tubes and a plurality of fins; said fins being in thermal communication with said plurality of fluid-carrying tubes and structured to transfer heat away therefrom, said plurality of fins consisting of a fin stock material from an 3xxx-series aluminium alloy and comprising by weight
   Mn 0.5 to 2.0%
   Si 0.5% to 1.5%
   Fe 0 to 1.8%
   Zn 0 to 2.5%
   Mg 0 to 0.5%
   Cu 0 to 0.4%, and
   furthermore a purposive addition of Bi 0.03% to 0.5% as wetting agent, with the remainder comprising aluminium and tolerable impurities, wherein said fin stock material does not have any additional metallic layers such that the wetting agent is diffused to the outer surface of the fin stock material when the fin stock material is brazed; and
   wherein the fin stock material at final gauge has a thickness of 0.05 to 0.15 mm.

2. A brazed assembly according to claim 1, wherein said aluminium alloy comprises further one or more elements selected from the group of up to 0.25% Zr, up to 0.25% Cr, up to 0.25% V, up to 0.25% Ti, up to 0.20% In, up to 0.3% Ni.

3. A brazed assembly according to claim 1, wherein said aluminium alloy comprises Bi in a range of 0.03% to 0.35%.

4. A brazed assembly according to claim 1, wherein said aluminium alloy further comprises Mg in a range of 0.01% to 0.35%.

5. A brazed assembly according to claim 1, wherein said aluminium alloy comprises Mn in the range of 0.8% to 2.0%.

6. A brazed assembly according to claim 1, and wherein said aluminium alloy comprises Fe in the range of 0.15% to 0.8%.

7. A brazed assembly according to claim 1, wherein said aluminium alloy comprises,
   Mn 0.5% to 2.0%
   Si 0.3% to 1.5%
   Fe 0 to 1.8%
   Zn 0 to 2.5%
   Mg 0 to 0.5%
   Cu 0 to 0.4%
   Bi 0.03% to 0.5%,
   optionally one or more elements selected from the group of up to about 0.25% Zr, up to about 0.25% Cr, up to about 0.25% V, up to about 0.25% Ti, up to about 0.20% In, up to about 0.3% Ni, with the remainder comprising aluminium and tolerable impurities.

8. A brazed assembly according to claim 1, wherein said aluminium alloy comprises Cu up to 0.20%.

9. A brazed assembly according to claim 1, wherein said aluminium alloy comprises Cu at a level below 0.05%.

10. A brazed assembly according to claim 1, wherein said aluminium alloy comprises Zr in the range of 0.05% to 0.20%.

11. A brazed assembly according to claim 1, wherein said aluminium alloy comprises Zr in the range of 0.06% to 0.15%.

12. A brazed assembly according to claim 1, wherein said aluminium alloy comprises Ti in the range of up to 0.25%.

13. The brazed assembly according to claim 1, wherein the brazed assembly is a heat exchanger.

14. A brazed assembly according to claim 1, wherein said aluminium alloy comprises,
   Mn 0.5% to 2.0%
   Si 0.3° A to 1.5%
   Fe 0 to 1.8%
   Zn 0.35 to 2.5%
   Mg 0.01 to 0.35%
   Cu 0 to 0.4%
   Bi 0.03% to 0.5%,
   In 0.01 to about 0.20%
   Zr 0.05 to about 0.20%,
   optionally one or more elements selected from the group of up to about 0.25% Cr, up to about 0.25% V, up to about 0.25% Ti, up to about 0.3% Ni, with the remainder comprising aluminium and tolerable impurities.

15. A brazed assembly according to claim 1, wherein said aluminium alloy comprises,
   Mn 0.5% to 2.0%
   Si 0.3° A to 1.5%
   Fe 0 to 1.8%
   Zn 0 to 2.5%
   Mg 0 to 0.5%
   Cu 0 to 0.4%
   Zr 0.05 to about 0.25%,
   Cr 0 to about 0.25%,
   Bi 0.03% to 0.5%,
   Ti 0 to about 0.25%,
   with the remainder comprising aluminium and tolerable impurities each up to 0.05%, total impurities 0.25% maximum.

16. A brazed assembly according to claim 1, wherein in said fin stock material
   Fe 0.2 to 0.8%
   Mg 0.01 to 0.35%
   Cu 0 to 0.2%
   Cr 0 to 0.05%,
   Bi 0.03% to 0.35%,
   Ti 0.03 to 0.09%,
   which is free of Na, Li, K and Ca, with the remainder comprising aluminium and tolerable impurities each up to 0.05%, total impurities 0.25% maximum.

17. A brazed assembly according to claim 1, wherein said aluminium alloy consists of,
   Mn 0.5% to 2.0%
   Si 0.3° A to 1.5%
   Fe 0 to 1.8%
   Zn 0 to 2.5%
   Mg 0 to 0.5%
   Cu 0 to 0.4%
   Zr 0.05 to about 0.25%,
   Cr 0 to about 0.05%, Bi 0.03% to 0.5%,
Ti 0 to about 0.25%
which is free of Na, Li, K and Ca, with the remainder comprising aluminium and tolerable impurities each up to 0.05%, total impurities 0.25% maximum.

18. A brazed assembly according to claim 1, wherein in said fin stock material the level of Fe is 0.2 to 0.8%
the level of Mg is 0.01 to 0.35%
the level of Cu is 0 to 0.2%
the level of Cr is 0 to 0.05%,
the level of Bi is 0.03% to 0.35%,
which is free of Na, Li, K and Ca, with the remainder comprising aluminium and tolerable impurities each up to 0.05%, total impurities 0.25% maximum.

19. The brazed assembly according to claim 1, wherein said fin stock material has an H1x or H2x temper.

* * * * *